United States Patent
Kojima et al.

(10) Patent No.: US 12,549,022 B2
(45) Date of Patent: Feb. 10, 2026

(54) POWER SUPPLY APPARATUS CONFIGURED TO DETECT CURRENT PATH ABNORMALITIES

(71) Applicant: TOYOTA JIDOSHA KABUSHIKI KAISHA, Toyota (JP)

(72) Inventors: Koichi Kojima, Toyota (JP); Soichiro Ito, Toyota (JP); Masashi Yoshimi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/763,406

(22) Filed: Jul. 3, 2024

(65) Prior Publication Data
US 2025/0023367 A1   Jan. 16, 2025

(30) Foreign Application Priority Data
Jul. 11, 2023   (JP) .................................. 2023-113891

(51) Int. Cl.
*H02J 7/00*   (2006.01)
*H02J 7/34*   (2006.01)

(52) U.S. Cl.
CPC .......... *H02J 7/0024* (2013.01); *H02J 7/0047* (2013.01); *H02J 7/345* (2013.01); *H02J 2207/50* (2020.01)

(58) Field of Classification Search
CPC ........... H02J 7/13; H02J 7/0024; H02J 7/0029
See application file for complete search history.

(56) References Cited

U.S. PATENT DOCUMENTS

| | | | | |
|---|---|---|---|---|
| 3,654,538 | A * | 4/1972 | Gardberg | H02J 7/0034 361/84 |
| 6,476,571 | B1 * | 11/2002 | Sasaki | B60K 6/26 318/245 |
| 12,240,338 | B2 * | 3/2025 | Uchiyama | H02J 7/0047 |
| 2014/0191720 | A1 * | 7/2014 | Sugiyama | H02J 7/1423 320/109 |
| 2019/0225088 | A1 * | 7/2019 | Masuda | B60L 53/00 |
| 2019/0359081 | A1 * | 11/2019 | Erhart | B60L 1/003 |
| 2020/0023746 | A1 * | 1/2020 | Kim | H02M 1/4216 |
| 2020/0341061 | A1 * | 10/2020 | Shin | G01R 31/3274 |
| 2021/0101494 | A1 * | 4/2021 | Lee | B60L 53/60 |
| 2021/0351684 | A1 * | 11/2021 | Nishimura | H02M 3/158 |
| 2023/0038790 | A1 * | 2/2023 | Ling | H01M 10/625 |
| 2024/0106367 | A1 | 3/2024 | Tani | |
| 2025/0023368 | A1 * | 1/2025 | Kojima | H02J 7/0063 |
| 2025/0211095 | A1 * | 6/2025 | Toyama | H02J 7/00 |

FOREIGN PATENT DOCUMENTS

| JP | 2014-087156 A | 5/2014 |
|---|---|---|
| JP | 2022-187416 A | 12/2022 |

* cited by examiner

*Primary Examiner* — Adi Amrany
(74) *Attorney, Agent, or Firm* — Dinsmore & Shohl LLP

(57) ABSTRACT

In a power supply apparatus, a controller programmed to control the system main relay, the charging relay, the series connection relay, the parallel connection relay, and the first and second neutral point relays such that the first and second capacitors are both precharged, to detect the presence of an abnormality in a first current path charging the first capacitor based on voltage of the first capacitor, and to detect the presence of an abnormality in a second current path charging the second capacitor based on voltage of the second capacitor.

2 Claims, 5 Drawing Sheets

POWER SUPPLY APPARATUS CONFIGURED TO DETECT CURRENT PATH ABNORMALITIES

CROSS-REFERENCE TO RELATED APPLICATION

The present disclosure claims priority to Japanese Patent Application No. 2023-113891 filed on Jul. 11, 2023, which is incorporated herein by reference in its entirety including specification, drawings and claims.

TECHNICAL FIELD

The present disclosure relates to a power supply apparatus.

BACKGROUND

A proposed power supply apparatus supplies power to inverters and converters (as described in, for example, Japanese Laid-Open Patent Publication No. 2014-87156). This power supply apparatus includes a first power storage device, a second power storage device, a motor, an inverter, a converter, a first relay, a second relay, a first capacitor, a second capacitor, and a DC charger. The second power storage device is connected to the inverter in parallel with the converter and the first power storage device. The inverter drives the motor. The converter supplies power from the first power storage device to the inverter with voltage conversion. The first relay is attached to the first power line connecting the first power storage device and the converter. The second relay is attached to the second power line connecting the second power storage device and the inverter. The first capacitor is connected to the side closer to the converter than the first relay in the first power line. The second capacitor is connected to the power line of the inverter. The DC charger is connected to the side closer to the second power storage device than the second relay in the second power line. The DC charger supplies external DC power supplied from an external charging connector to the second power line. This power supply apparatus turns off the first relay, turns on the second relay and detects an abnormality of the second relay based on the voltage of the second capacitor. After detecting the failure of the second relay, the first relay is turned on and the first relay failure detection is executed based on the voltage of the first capacitor.

SUMMARY

Recently, a proposed power supply apparatus switches between connecting the first and second power storage devices in series and connecting the first and second power storage devices in parallel. This power supply apparatus includes a DC charger including a charging power line, a charging relay, a series connection line, a series connection relay, a parallel connection line, a parallel connection relay, a neutral point line, first and second neutral point relays, and a second capacitor. The charging power line connects an external charging connector to the power line between the system main relay and the inverter. The charging relay is attached to the charging power line. The series connection line connects the first and second power storage devices in series. The series connection relay is attached to the series connection line. The parallel connection line connects the side closer to the first power storage device than the series connection relay in the series connection line and the side closer to the second power storage device than the negative side relay and the precharge relay in the negative side line of the power line. The parallel connection relay is attached to the parallel connection lines. The neutral point line connects the neutral point of the three-phase AC motor and the side closer to the second power storage device than the series connection relay in the series connection line. The first neutral point relay is attached to the neutral point line. The second neutral point relay is attached to the side closer to the second power storage device than the first neutral point in the neutral point line. The second capacitor is attached to the neutral point line between the first and second neutral point relays and the side closer to the inverter than the negative side relay in the negative side line. In this power supply apparatus, it is desired to detect current path abnormalities more appropriately.

A power supply apparatus of the present disclosure mainly aims to detect current path abnormalities more appropriately.

In order to achieve the above primary object, the power supply apparatus of the present disclosure employs the following configuration.

The present disclosure is directed to a power supply apparatus. The power supply apparatus is configured to supply power to an inverter including a plurality of switching elements and diodes connected in parallel in opposite directions to each switching element and driving a three-phase AC motor. The power supply apparatus includes a power storage device configured to include a first power storage device and a second power storage device; a system main relay including a positive side relay attached to a positive side line of a power line connecting the power storage device and the inverter, a negative side relay attached to a negative side line of the power line, and a precharge circuit including a precharge resistor and a precharge relay connected in series to bypass the negative side relay; a first capacitor attached to the power line; a DC charger configured to use external DC power to charge the power storage device including a charging power line connecting the external charging connector supplied with the external DC power and power line between the system main relay and the inverter, a charging relay attached to the charging power line, a series connection line connecting the first and second power storage devices in series, a series connection relay attached to the series connection line, a parallel connection line connecting the side closer to the first power storage device than the series connection relay in the series connection line and the side closer to the second power storage device than the negative side relay and the precharge circuit in the negative side line of the power line, a parallel connection relay attached to the parallel connection line, a neutral point line connecting the neutral point of the three-phase AC motor and the side closer to the second power storage device than the series connection relay in the series connection line, a first neutral point relay attached to the neutral point line, a second neutral point relay attached to the side closer to the second power storage device than the first neutral point relay in the neutral point line, a second capacitor attached between the first and second neutral point relays in the neutral point line and the side closer to the inverter than the negative side relay and the precharge circuit in the negative side line of the power line; and a controller programmed to control the system main relay, the charging relay, the series connection relay, the parallel connection relay, and the first and second neutral point relays such that the first and second capacitors are both precharged, to detect the presence of an abnormality in a first current path charging the first capacitor based on voltage of the first capacitor, and to detect the presence of an abnormality in a second current path charging the second capacitor based on voltage of the second capacitor.

In this power supply apparatus of the present disclosure, the controller is programmed to control the system main relay, the charging relay, the series connection relay, the parallel connection relay, and the first and second neutral point relays such that the first and second capacitors are both precharged, to detect the presence of the abnormality in a first current path charging the first capacitor based on voltage of the first capacitor, and to detect the presence of the abnormality in a second current path charging the second capacitor based on voltage of the second capacitor. The power supply apparatus of the present disclosure enables to detect current path abnormalities more appropriately.

DESCRIPTION OF EMBODIMENTS

Figure 1:
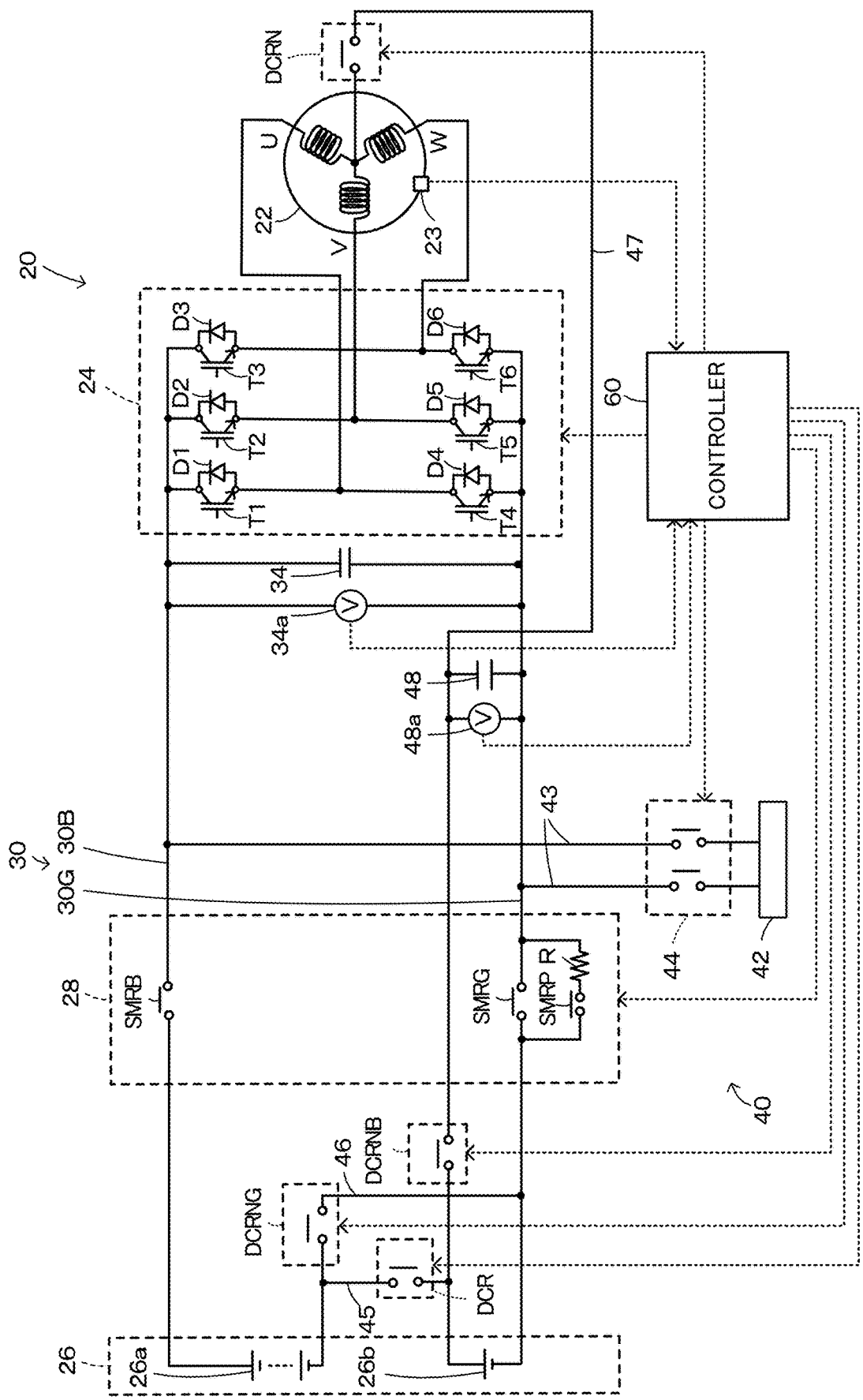
FIG. 1 is a configuration diagram illustrating the schematic configuration of a power supply apparatus 20 according to one embodiment of the present disclosure.

The following describes some aspects of the disclosure with reference to embodiments. FIG. 1 is a configuration diagram illustrating the schematic configuration of a power supply apparatus 20 according to one embodiment of the present disclosure. The power supply apparatus 20 of the embodiment is configured to supply power to an inverter 24 that drives a motor 22. The power supply apparatus 20 includes a battery 26 as a power storage device, a system main relay 28, a first capacitor 34, a DC charger 40, and a controller 60.

The motor 22 is configured as a well-known three-phase AC motor that includes, for example, a rotor with a permanent magnet attached to its outer surface and a stator with three-phase coils wound around it. The inverter 24 is configured to include six transistors T1 to T6 as switching elements and six diodes D1 to D6 connected in parallel in opposite directions to the transistors T1 to T6. The transistors T1 to T6 are arranged in pairs such that they are source and sink side to the positive electrode bus bar and negative electrode bus bar that are shared by the inverter 24 as a power line 30. Each of connection points between pairs of the transistors T1 to T6 is connected to each of the three phase coils (U, V, and W phases) of the motor 22. The inverter 24 forms a rotating magnetic field in the three-phase coils to drive the motor 22 by controlling the ratio of on-time of the paired transistors T1 to T6 with the voltage acting between the positive electrode bus bar and the negative electrode bus bar. The first capacitor 34 for smoothing is connected to the power line 30.

The battery 26 includes a first battery 26a as a first power storage device and a second battery 26b as a second power storage device with a capacity of n times ("n" is an integer) the capacity of the first battery 26a, and is connected to the power line 30. The first and second batteries 26a and 26b are configured as lithium ion rechargeable batteries and nickel metal hydride batteries, for example.

The system main relay 28 is connected to the power line 30. The system main relay 28 includes a positive side relay SMRB, a negative side relay SMRG, and a precharge circuit. The positive side relay SMRB is attached to a positive side line 30B of the power line 30. The negative side relay SMRG is attached to a negative side line 30G of the power line 30. The precharge circuit includes a precharge resistor R and a precharge relay SMRP that are connected in series to bypass the negative side relay SMRG.

The DC charger 40 includes an external charging connector 42, a charging power line 43, a charging relay 44, a series connection line 45, a series connection relay DCR, a parallel connection line 46, a parallel connection relay DCRNG, a neutral point line 47, first and second neutral point relays DCRN and DCRNB, and a second capacitor 48. The external charging connector 42 is connected to an external DC power source and is supplied with DC power (external DC power) from an external source. The charging power line 43 is connected to external charging connector 42 and the power line 30 between the system main relay 28 and the inverter 24. The charging relay 44 is attached to the charging power line 43. The series connection line 45 connects the first battery 26a and the second battery 26b in series. The series connection relay DCR is attached to the series connection line 45. The parallel connection line 46 connects the side closer to the first battery 26a than the series connection relay DCR in the series connection line 45 and the side closer to the second battery 26b than the negative side relay SMRG and precharge circuit in the negative side line 30G of the power line 30. The parallel connection relay DCRNG is attached to the parallel connection line 46. The neutral point line 47 connects the neutral point of motor 22 and the side closer to the second battery 26b than the series connection relay DCR in the series connection line 45. The first neutral point relay DCRN is attached to the neutral point line 47. The second neutral relay DCRNB is attached the side closer to the second battery 26b than the first neutral relay DCRN in the neutral point line 47. The second capacitor 48 is attached between the first neutral point relay DCRN and the second neutral point relay DCRNB in the neutral point line 47 and the side closer to the inverter 24 than the negative side relay SMRG and precharge circuit in the negative side line 30G of the power line 30.

The controller 60, not shown in the figure, is configured as a microprocessor with a CPU at its core. In addition to the CPU, the controller 60 includes a ROM for storing processing programs, RAM for temporarily storing data, flash memory, input/output ports, and communication ports. Signals from various sensors are input to the controller 60 via the input ports. The signals input to the controller 60 include, for example, rotational position θm from rotational position detection sensor (e.g., resolver) 23 that detects the rotational position of the rotor of the motor 22, phase currents flowing in the three phase coils (U, V, and W phases) of the motor 22, voltage sensor 34a that detects voltage in the first capacitor 34 Voltage VH, voltage VL from voltage sensor 48a that detects voltage of the second capacitor 48, etc. The controller 60 is also connected to a communication line for communicating with an external power source device via the external charging connector 42.

Various control signals are output from the controller 60 via the output ports. The signals output from the controller 60 include, for example, switching control signals to the transistors T1 to T6 of the inverter 24, drive control signals to the system main relay 28, drive control signals to the charging relay 44, drive control signals to the series connection relay DCR, drive control signals to the parallel connection relay DCRNG, drive control signals to the first neutral point relay DCRN, drive control signals to the second neutral point relay DCRNB, etc.

When the external power source is connected to the external charging connector 42 of the DC charger 40, the controller 60 inputs the voltage Vd of the DC power supplied by the external power source (external DC voltage Vd). The battery 26 is charged by the first charge by the DC charger 40 when the external DC voltage Vd is the rated voltage V1 of the battery 26 with the first battery 26a and the second battery 26b connected in series, and is charged by the second charge by the DC charger 40 when the external DC voltage Vd is n times the rated voltage V1 ("n" is a positive value lower than the value 1). In the first charge, the controller 60 turns on the system main relay 28, the charging relay 44 and the series connection relay DCR, and turns off the parallel connection relay DCRNG and the first and second neutral point relays DCRN and DCRNB. Thus, in the first charge, the battery 26 is charged using the charging power line 43, the power line 30, and the series connection line 45, with the first battery 26a and the second battery 26b connected in series. In the second charge, the controller 60 turns on the positive side relay SMRB of the system main relay 28, the charging relay 44, the parallel connection relay DCRNG, and the first and second neutral point relays DCRN and DCRNB, and turns off the negative side relay SMRG of the system main relay 28, the pre-charge relay SMRP and the series connection relay DCR. Thus, in the second charge, the first battery 26a and the second battery 26b are connected in parallel. The first battery 26a is then charged by a current path from the positive side line of the charging power line 43 back to the negative side line of the charging power line 43 via the positive side line 30B of the power line 30, the first battery 26a, the parallel connection line 46, and the negative side line 30G of the power line 30. The second battery 26b is charged by a current path from the positive side line of the charging power line 43 back to the negative side line of the charging power line 43 via the positive side line 30B of the power line 30, one of the diodes D1-D3 of the inverter 24, the motor 22, the neutral point line 47, the second battery 26b, and the negative side line 30G of the power line 30.

Figure 2:
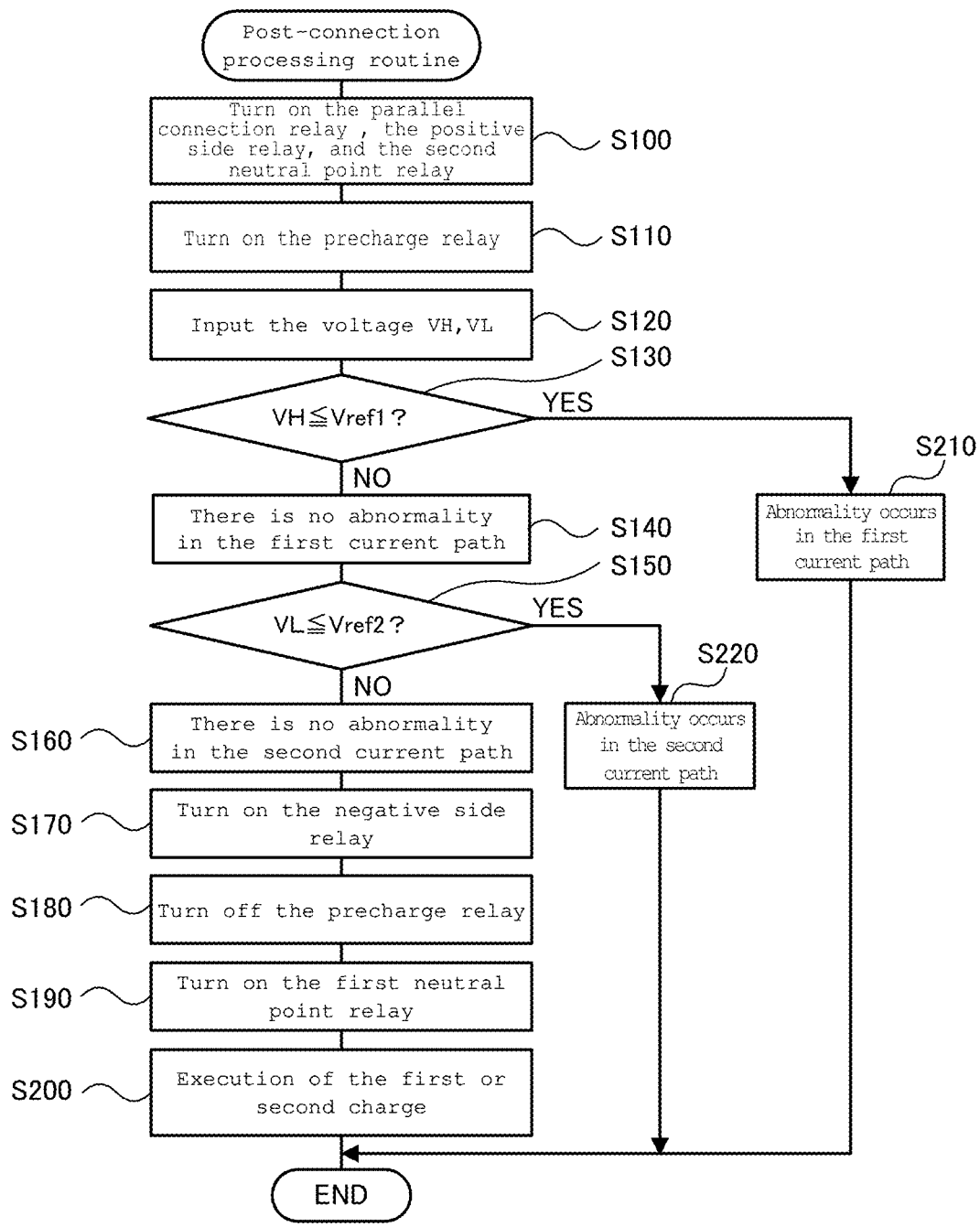
FIG. 2 is a flowchart showing one example of a post-connection processing routine executed by a controller 60.

The following describes the operation of the power supply apparatus 20 of the embodiment having the configuration described above or more specifically the operation when the first or second charge of the battery 26 is started by the DC charger 40. FIG. 2 is a flowchart showing one example of a post-connection processing routine executed by the controller 60. The controller 60 executes this routine after the external power source is connected to the external charging connector 42. Before the execution of this routine, the system main relay 28, the charging relay 44, the series connection relay DCR, the parallel connection relay DCRNG, and the first and second neutral point relays DCRN and DCRNB are all off.

Figure 3:
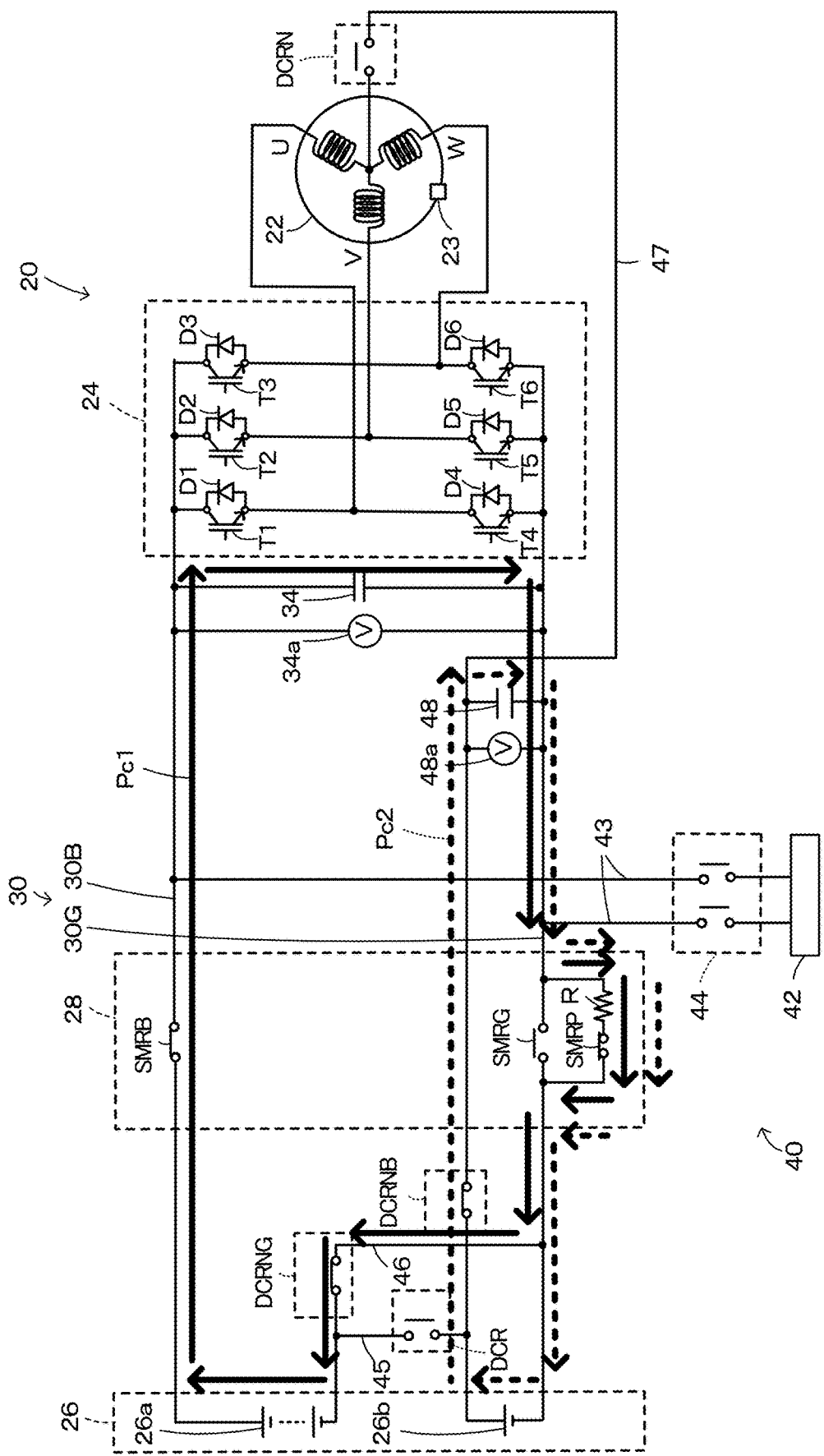
FIG. 3 illustrates a current path in the power supply apparatus 20 when step S110 is executed.

When this routine is executed, the controller 60 turns on the parallel connection relay DCRNG, the positive side relay SMRB of the system main relay 28, and the second neutral point relay DCRNB (step S100). Next, the controller 60 turns on the precharge relay SMRP of the system main relay 28 (step S110). FIG. 3 illustrates a current path in the power supply apparatus 20 when the step S110 is executed. A Thick solid line in FIG. 3 shows a schematic of a first current path Pc1. A thick broken line shows a schematic of a second current path Pc2. The first current path Pc1 is the path from the first battery 26a back to the first battery 26a via the positive side line 30B of the power line 30, the first capacitor 34, the negative side line 30G of the power line 30, and the parallel connection line 46. When there is no disconnection or other abnormality in the first current path Pc1, the first capacitor 34 is precharged (charged) by the current flowing through the first current path Pc1 and the voltage VH increases. The second current path Pc2 is the path from the second battery 26b back to the second battery 26b via the neutral point line 47, the second capacitor 48 and the negative side line 30G of the power line 30. When there is no disconnection or other abnormality in the second current path Pc2, the second capacitor 48 is precharged (charged) by the current flowing through the second current path Pc2, and the voltage VL increases.

The controller 60 then inputs the voltage VH from the voltage sensor 34a and the voltage VL from the voltage sensor 48a (step S120). The controller 60 then determines whether the voltage VH is equal to or less than threshold value Vref1 (step S130). The threshold value Vref1 is the threshold for determining whether there is an abnormality that prevents the first capacitor 34 from being charged, such as a disconnection in the first current path Pc1. The threshold value Vref1 is set slightly higher than the value 0, e.g., 3V, 5V, 8V, etc. When the voltage VH is higher than the threshold value Vref1 in step S130, the controller 60 determines that there is no abnormality in the first current path Pc1 (step S140).

The controller 60 further determines whether the voltage VL is equal to or less than the threshold value Vref2 (step S150). The threshold value Vref2 is the threshold for determining whether there is an abnormality that prevents the second capacitor 48 from being charged, such as a disconnection in the second current path Pc2. The threshold value Vref2 is set slightly higher than the value 0, e.g., 3V, 5V, 8V, etc. When the voltage VL is higher than the threshold value Vref2 in step S150, the controller 60 determines that there is no abnormality in the second current path Pc2 (step S160).

When there is no abnormality in the first current path Pc1 and the second current path Pc2, the controller 60 turns on the negative side relay SMRG of the system main relay 28 (step S170), turns off the precharge relay SMRP of the system main relay 28 (step S180), and turns on the first neutral point relay DCRN (step S190). The controller 60 then executes the first or second charge (step S200) and this routine is terminated.

When the voltage VH is equal to or less than the threshold Vref1 in step S130, the controller 60 determines s that an abnormality occurs in the first current path Pc1 (step S210) and this routine is terminated without execution of the first and second charging.

When the voltage VL is equal to or less than the threshold Vref2 in step S150, the controller 60 determines s that an abnormality occurs in the second current path Pc2 (step S220) and this routine is terminated without execution of the first and second charging. Thus, the power supply apparatus 20 of the present embodiment detects the presence or absence of an abnormality in the first current path Pc1 charging the first capacitor 34 based on the voltage VH of the first capacitor 34 and the presence or absence of an abnormality in the second current path Pc2 charging the second capacitor 48 based on the voltage VL of the second capacitor 48. This enables the power supply apparatus 20 to detect current path abnormalities more appropriately.

As described above, in the power supply apparatus 20 of the embodiment, the controller 60 controls the system main relay 28, the charging relay 44, the series connection relay DCR, the parallel connection relay DCRNG, the first neutral point relay DCRN, and the second neutral point relay DCRNB such that the first capacitor 34 and the second capacitor 48 are both precharged, detects whether the first current path Pc1 charging the first capacitor 34 is abnormal based on the voltage VH of the first capacitor 34, and detects whether the second current path Pc2 charging the second capacitor 48 is abnormal based on the voltage VL of the second capacitor 48. This enables the power supply apparatus 20 to detect current path abnormalities more appropriately.

The controller 60 also turns on the positive side relay SMRB and the precharge relay SMRP of the system main relay 28, the parallel connection relay DCRNG and the second neutral point relay DCRNB, and turns off the negative side relay SMRG of the system main relay 28, the charging relay 44, the series connection relay DCR and the first neutral point relay DCRN such that both the first capacitor 34 and the second capacitor 48 are precharged. This enables the controller 60 to make the first current path Pc1 to be a path from the first battery 26a back to the first battery 26a via the positive side line 30B of the power line 30, the first capacitor 34, the negative side line 30G of the power line 30, and the parallel connection line 46. This also enables to the controller 60 to make the second current path Pc2 to be a path from the second battery 26b back to the second battery 26b via the neutral point line 47, the second capacitor 48, and the negative side line 30G of the power line 30.

The controller 60 controls the system main relay 28, the charging relay 44, the series connection relay DCR, the parallel connection relay DCRNG, the first neutral point relay DCRN, and the first neutral point relay DCRN such that the first capacitor 34 and the second capacitor 48 are both precharged when an external power source is connected to the external charging connector 42, detects the presence or absence of an abnormality in the first current path Pc1 charging the first capacitor 34 based on the voltage VH of the first capacitor 34, and detects the presence or absence of an abnormality in the second current path Pc2 charging the second capacitor 48 based on the voltage VL of the second capacitor 48. This enables the power supply apparatus 20 to detect current path abnormalities more appropriately.

Figure 4:
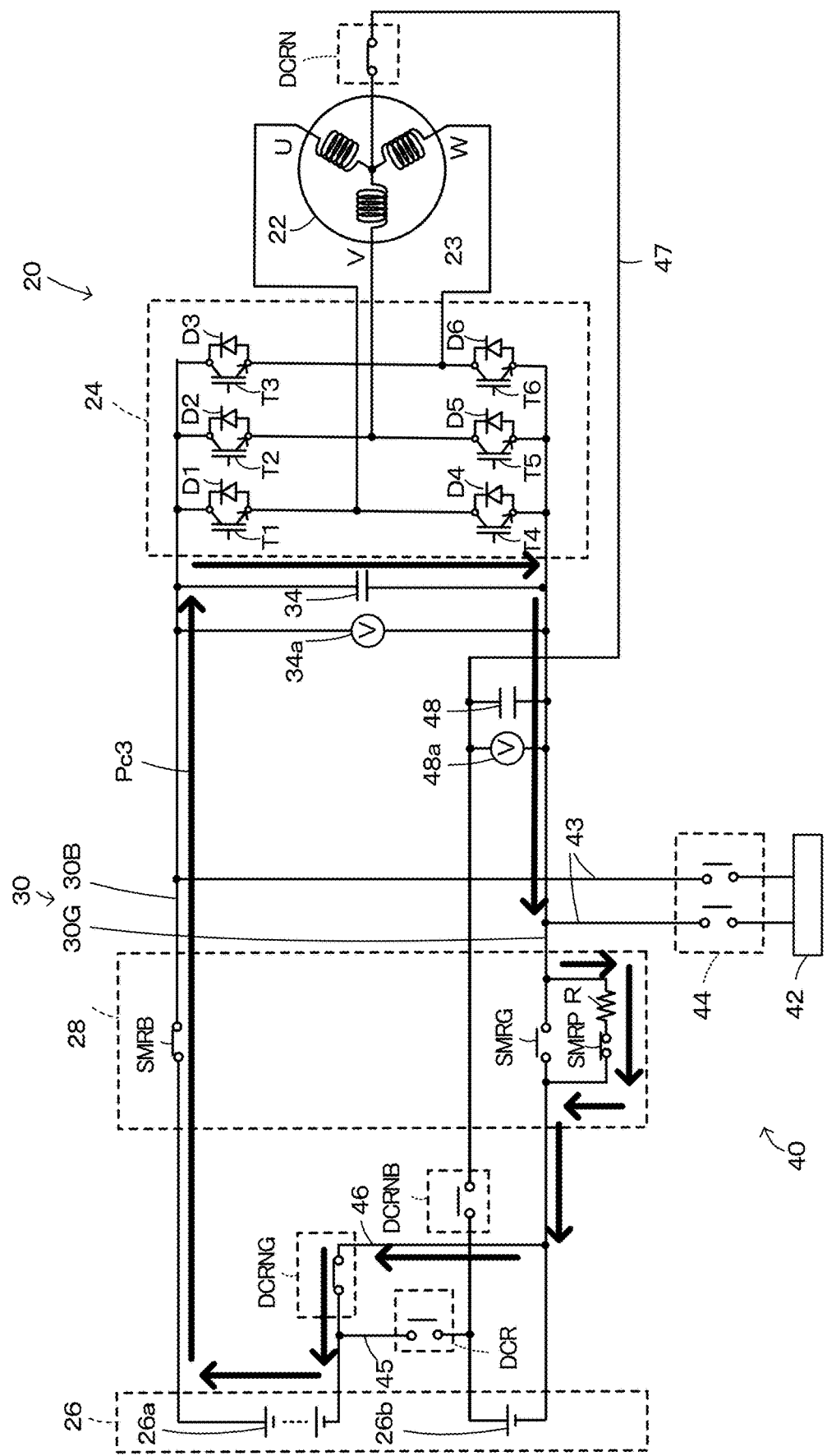
FIG. 4 illustrates a third current path Pc3.

In the embodiment described above, the controller 60 turns on the positive side relay SMRB of the system main relay 28, the precharge relay SMRP, the parallel connection relay DCRNG, and the second neutral point relay DCRNB, and turns off the negative side relay SMRG of the system main relay 28, the charging relay 44, the series connection relay DCR and the first neutral point relay DCRN, and the first capacitor 34 and the second capacitor 48 are both precharged. However, other techniques may be used to precharge both the first capacitor 34 and the second capacitor 48. In this case, the controller 60 first turns on the parallel connection relay DCRNG, the positive side relay SMRB of the system main relay 28 and the first neutral point relay DCRN. Next, the controller 60 turns on the precharge relay SMRP of the system main relay 28. This processing precharges the first capacitor 34 by applying current in the third current path Pc3. FIG. 4 illustrates the third current path Pc3. The third current path Pc3 is the path from the first battery 26a back to the first battery 26a via the positive side line 30B of the power line 30, the first capacitor 34, the negative side line 30G of the power line 30 and the parallel connection line 46.

The controller 60 then inputs the voltage VH from the voltage sensor 34a and determines whether the voltage VH is equal to or less than the threshold value Vref1 using the same process as in step S130. When the voltage VH is equal to or less than the threshold Vref1, the controller 60 determines that an abnormality such as a disconnection occurs in the third current path Pc3 and terminates the processing. When the voltage VH exceeds the threshold value Vref1, the controller 60 determines that there is no disconnection or other abnormality in the third current path Pc3.

Figure 5:
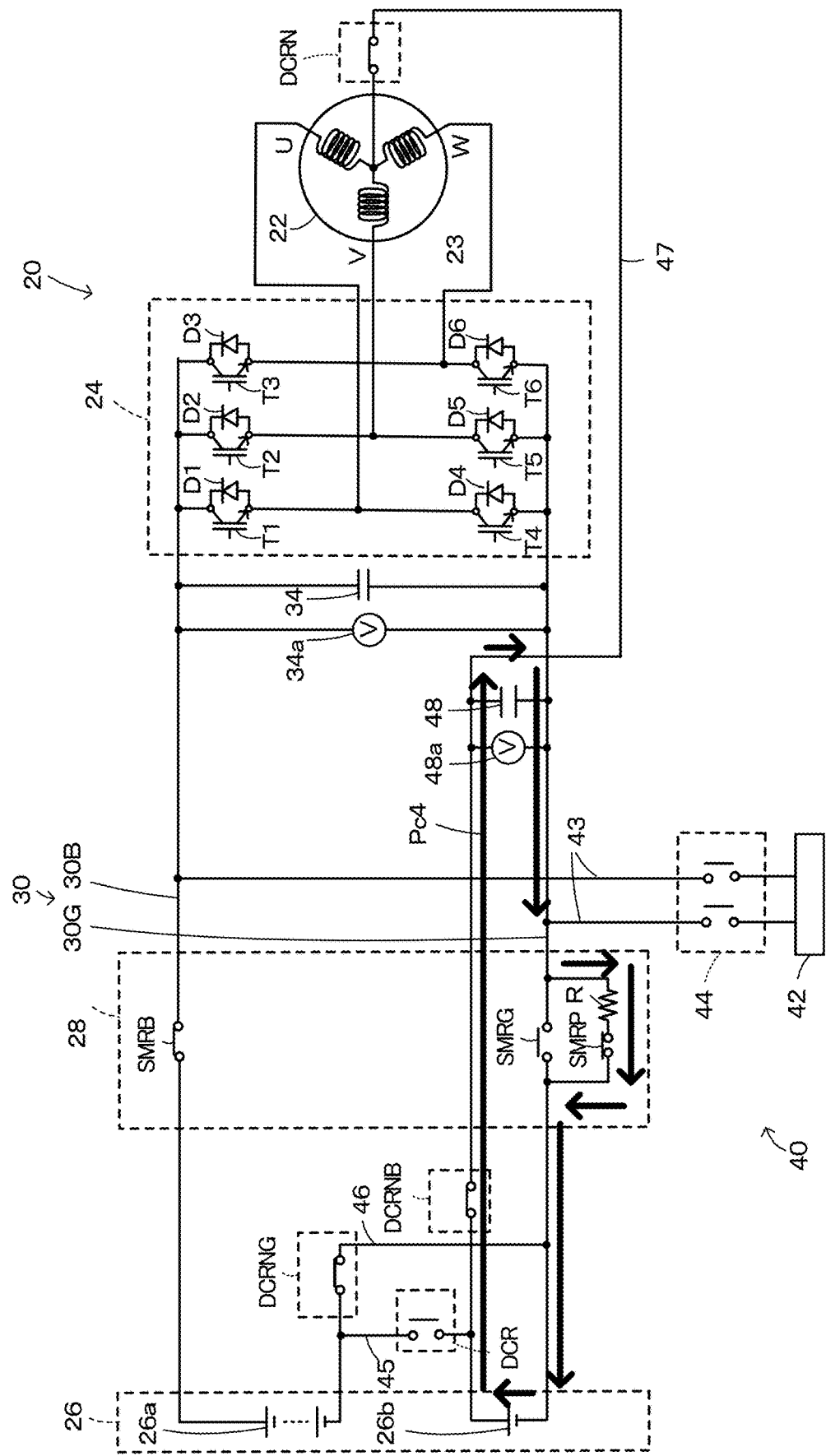
FIG. 5 illustrates a fourth current path Pc4.

When the controller 60 determines that there is no disconnection or other abnormality in the third current path Pc3, the controller turns on the second neutral point relay DCRNB. This processing precharges the second capacitor 48 by applying current in the fourth current path Pc4. FIG. 5 illustrates the fourth current path Pc4. Because the first capacitor 34 is already precharged, the diodes D1-D3 of the inverter 24 are biased in the opposite direction, and no current flows through the diodes D1-D3 and the motor 22 to the neutral point line 47. The fourth current path Pc4 is the path from the second battery 26b back to the second battery 26b via the neutral point line 47, the second capacitor 48, and the negative side line 30G of the power line 30.

The controller 60 then inputs the voltage VL from the voltage sensor 48a and determines whether the voltage VL is equal to or less than the threshold value Vref2 in the same processing as in step S150. When the voltage VL is equal to or less than the threshold Vref2, the controller 60 determines that an abnormality such as a disconnection occurs in the fourth current path Pc4 and terminates the processing. When the voltage VL exceeds the threshold value Vref2, the controller 60 determines that there is no disconnection or other abnormality in the fourth current path Pc4, executes the first or second charge, and terminates the processing. This enables the power supply apparatus 20 to detect current path abnormalities more appropriately.

In the embodiment described above, the controller 60 executes the processing illustrated in FIG. 2 when the external power source device is connected to the external charging connector 42. However, the controller 60 executes the processing illustrated in FIG. 2 not only when the external power source is connected to the external charging connector 42, but also at any time when the first capacitor 34 and second capacitor 48 need to be precharged.

In the embodiment described above, the power supply apparatus 20 includes the battery 26 with the first battery 26a and the second battery 26b, but at least one of the first battery 26a and the second battery 26b may be a capacitor.

As described above, a power supply apparatus according to one aspect of the present disclosure is configured to supply power to an inverter including a plurality of switching elements and diodes connected in parallel in opposite directions to each switching element and driving a three-phase AC motor. The power supply apparatus includes a power storage device configured to include a first power storage device and a second power storage device; a system main relay including a positive side relay attached to a positive side line of a power line connecting the power storage device and the inverter, a negative side relay attached to a negative side line of the power line, and a precharge circuit including a precharge resistor and a precharge relay connected in series to bypass the negative side relay; a first capacitor attached to the power line; a DC charger configured to use external DC power to charge the power storage device including a charging power line connecting the external charging connector supplied with the external DC power and power line between the system main relay and the inverter, a charging relay attached to the charging power line, a series connection line connecting the first and second power storage devices in series, a series connection relay attached to the series connection line, a parallel connection line connecting the side closer to the first power storage device than the series connection relay in the series connection line and the side closer to the second power storage device than the negative side relay and the precharge circuit in the negative side line of the power line, a parallel connection relay attached to the parallel connection line, a neutral point line connecting the neutral point of the three-phase AC motor and the side closer to the second power storage device than the series connection relay in the series connection line, a first neutral point relay attached to the neutral point line, a second neutral point relay attached to the side closer to the second power storage device than the first neutral point relay in the neutral point line, a second capacitor attached between the first and second neutral point relays in the neutral point line and the side closer to the inverter than the negative side relay and the precharge circuit in the negative side line of the power line; and a controller programmed to control the system main relay, the charging relay, the series connection relay, the parallel connection relay, and the first and second neutral point relays such that the first and second capacitors are both precharged, to detect the presence of an abnormality in a first current path charging the first capacitor based on voltage of the first capacitor, and to detect the presence of an abnormality in a second current path charging the second capacitor based on voltage of the second capacitor.

In this power supply apparatus of the present disclosure, the controller is programmed to control the system main relay, the charging relay, the series connection relay, the parallel connection relay, and the first and second neutral point relays such that the first and second capacitors are both precharged, to detect the presence of an abnormality in a first current path charging the first capacitor based on voltage of the first capacitor, and to detect the presence of an abnormality in a second current path charging the second capacitor based on voltage of the second capacitor. The power supply apparatus of the present disclosure enables to detect current path abnormalities more appropriately.

In the power supply apparatus of this aspect, the controller may be programmed to turn on the positive side relay and the precharge relay of the system main relay, the precharge relay and the parallel connection relay and the second neutral point relay, and to turn off the negative side relay of the system main relay, the charging relay, the series connection relay and the first neutral point relay such that the first and second capacitors are both precharged. This enables the controller to make the first current path to be the path from the first battery back to the first battery via the positive side line of the power line, the first capacitor, the negative side line of the power line, and the parallel connection line. The controller makes the second current path to be path from the second battery back to the second battery via the neutral point power line, the second capacitor, and the negative side line of the power line.

In the power supply apparatus of this aspect, the controller may be programmed, when an external power source supplying the external DC power is connected to the external charging connector, to control the system main relay, the charging relay, the series connection relay, the parallel connection relay and the first and second neutral point relays such that the first and second capacitors are both precharged, to detect the presence of the abnormality in the first current path based on the voltage of the first capacitor, and to detect the presence of the abnormality in the second current path based on the voltage of the second capacitor. This enables the power supply apparatus of the present disclosure to detect the presence of abnormalities in the first and second current paths when the external power source supplying the external DC power is connected to the external charging connector.

The following describes the correspondence relationship between the primary components of the embodiment and the primary components of the disclosure described in Summary. The first battery 26a of the embodiment corresponds to the "first power storage device", the second battery 26b corresponds to the "second power storage device", the battery 26 corresponds to the "power storage device", the positive side relay SMRB corresponds to the "positive side relay", the negative side relay SMRG corresponds to the "negative side relay", the precharge resistor R corresponds to the "precharge resistor", the precharge relay SMRP corresponds to the "precharge relay", the system main relay 28 corresponds to the "system main relay", the first capacitor 34 corresponds to the "first capacitor", the charging power line 43 corresponds to the "charging power line", the charging relay 44 corresponds to the "charging relay", the series connection line 45 corresponds to the "series connection line", the series connection relay DCR corresponds to the "series connection relay", the parallel connection line 46 corresponds to the "parallel connection line", the parallel connection relay DCRNG corresponds to the "parallel connection relay", the neutral point line 47 corresponds to the "neutral point line", the first neutral point relay DCRN corresponds to the "first neutral point relay", the second neutral point relay DCRNB corresponds to the "second neutral point relay", the second capacitor 48 corresponds to the "second capacitor", the DC charger 40 corresponds to the "DC charger", and the controller 60 corresponds to the "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the power supply apparatus and so on.

What is claimed is:

1. A power supply apparatus configured to supply power to an inverter including a plurality of switching elements and diodes connected in parallel in opposite directions to each switching element and driving a three-phase AC motor, comprising:
 a power storage device including a first power storage device and a second power storage device;
 a system main relay including a positive side relay attached to a positive side line of a power line connecting the power storage device and the inverter, a negative side relay attached to a negative side line of the power line, and a precharge circuit including a precharge resistor and a precharge relay connected in series to bypass the negative side relay, the precharge circuit is configured to bypass the negative side relay when the negative side relay is in an off position;

a first capacitor attached to the power line;

a DC charger configured to use external DC power to charge the power storage device including a charging power line connecting an external charging connector supplied with the external DC power and the power line between the system main relay and the inverter, a charging relay attached to the charging power line, a series connection line connecting the first and second power storage devices in series, a series connection relay attached to the series connection line, a parallel connection line connecting the side closer to the first power storage device than the series connection relay in the series connection line and the side closer to the second power storage device than the negative side relay and the precharge circuit in the negative side line of the power line, a parallel connection relay attached to the parallel connection line, a neutral point line connecting the neutral point of the three-phase AC motor and the side closer to the second power storage device than the series connection relay in the series connection line, a first neutral point relay attached to the neutral point line, a second neutral point relay attached to the side closer to the second power storage device than the first neutral point relay in the neutral point line, a second capacitor attached between the first and second neutral point relays in the neutral point line and the side closer to the inverter than the negative side relay and the precharge circuit in the negative side line of the power line; and a controller programmed to turn on the positive side relay and the precharge relay of the system main relay, the parallel connection relay and the second neutral point relay, and to turn off the negative side relay of the system main relay, the charging relay, the series connection relay and the first neutral point relay such that the first and second capacitors are both precharged to detect the presence of an abnormality in a first current path charging the first capacitor based on voltage of the first capacitor, and to detect the presence of an abnormality in a second current path charging the second capacitor based on voltage of the second capacitor.

2. The power supply apparatus according to claim 1, wherein the controller is programmed, when an external power source supplying the external DC power is connected to the external charging connector, to control the system main relay, the charging relay, the series connection relay, the parallel connection relay and the first and second neutral point relays such that the first and second capacitors are both precharged, to detect the presence of the abnormality in the first current path based on the voltage of the first capacitor, and to detect the presence of the abnormality in the second current path based on the voltage of the second capacitor.

* * * * *